3,492,993
DEVICE FOR DISPENSING MEDICAMENTS SUCH AS CONTRACEPTIVES TO WOMEN
Hermann Tillmann, 120 Uhlandstrasse,
Berlin 31, Germany
Filed July 21, 1967, Ser. No. 655,056
Claims priority, application Germany, July 28, 1966,
T 31,695
Int. Cl. A61m *35/00, 31/00*
U.S. Cl. 128—261                 10 Claims

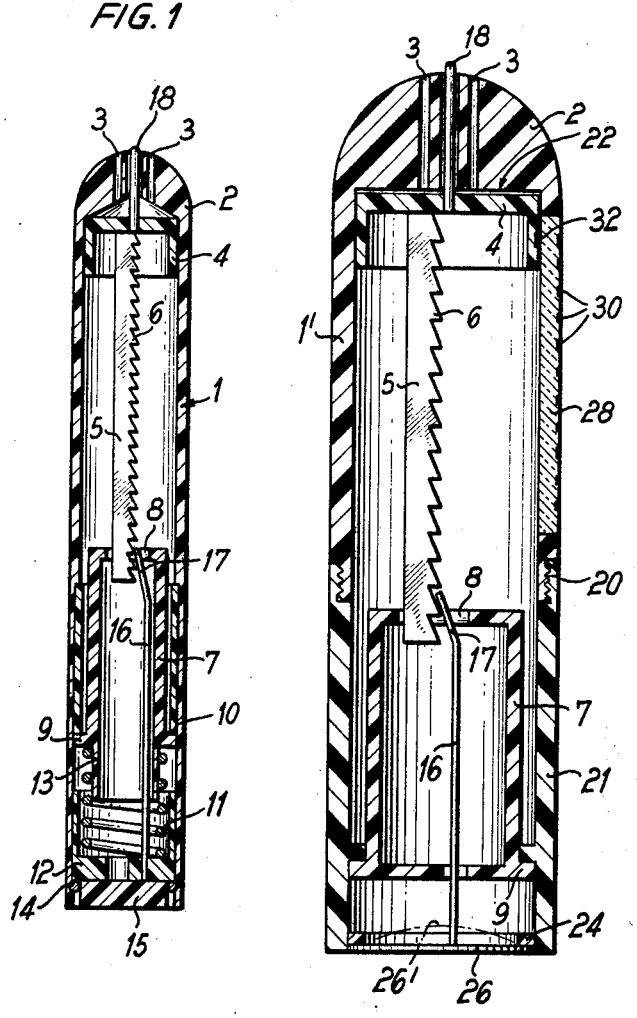

ABSTRACT OF THE DISCLOSURE

A device for dispensing medicaments such as contraceptives for women which operates without pressurizing gas, may be inserted into the vagina in a particularly easy manner, and allows an accurately measured quantity of the agent to be dispensed each time until the container is completely empty.

---

The invention relates to a device for dispensing medicaments such as contraceptives to women.

Medicaments and prophylactic agents of all kinds, particularly contraceptives, normally have to be introduced into the body via the vagina in the form of pastes or pills. In order to insert pastes, a capillary tube is frequently fitted or screwed on to the outlet opening of the container (a tube for example) containing the agent, the end of the capillary tube being inserted into the vagina and the agent then introduced by manual pressure upon the container. This operation is troublesome. A considerable quantity remains unused in the case of tubes. Further, unequal quantities are introduced or dispensed. The agent is not dispensed in measured quantities. Pills are disadvantageous in that it is difficult or impossible for them to be conveyed to the desired or necessary place in the body.

The invention eliminates the disadvantages stated in broad outline above.

The object of the invention is to provide a device which operates without pressurizing gas, is easily manipulated, may be inserted into the vagina in a particularly easy manner and is then simple to use, and allows an accurately measured quantity of the agent to be dispensed each time until the container is completely empty.

This object is achieved by the invention substantially in that the device is constructed as a hollow rod filled with the agent to be dispensed, particularly a contraceptive agent, which rod is insertable into the female vagina and has a circular cross section and a rounded, predominantly hemispherical tip provided with small spray or distributing apertures, and has a yielding base or base part to be actuated by thumb or finger pressure for axially displacing a dosing piston by a specific distance for pushing out the agent in measured quantities through the spray or distributing apertures.

In accordance with the invention, the yielding base or base part acts on the dosing piston via a feed gear, the dosing piston thus being forwardly displaced each time by a specific distance towards the tip of the rod. Advantageously, the construction is such that an equal quantity of the agent is dispensed each time.

Advantageously, the feed gear comprises the toothed-rack-like piston rod of the dosing piston and a push rod whose on end engages in the teeth of the piston rod and whose other end is connected to the yielding base or base part. Advantageously, a leaf spring serves as the push rod.

In accordance with the invention the yielding base or base part is arranged to be axially displaceable against spring pressure. Alternatively, in accordance with another feature of the invention, the base may be constructed as a resilient diaphragm pressed inwardly by thumb or finger pressure, thus pushing forward the feed gear and springing back into its initial position after the pressure ceases. According to a further feature of the invention, the piston rod of the dosing piston is guided in a sleeve embracing the feed end of the push rod and sprung relative to the yielding or axially displaceable base or base part. The upward stroke of this sleeve is limited. An indicator is provided, so that it is easily perceivable when the contents of the hollow rod are exhausted. In accordance with the invention, this purpose is served by a projecting pin, or the like, provided exteriorly on the base of the dosing piston and visible through an aperture in the tip of the hollow rod in the upper end position of the dosing piston, or projecting outwardly, thus indicating when the hollow rod is empty.

The invention is advantageous in that particularly the introduction of contraceptives into the vagina may be effected in a considerably more simple manner than previously, since the agent, which may be a paste or a fluid, vacates the hollow rod in the form of spray. When the agent is in the form of a paste it is advantageous if it is only slightly pasty. The device is easily stored and, if required, may even be carried in a handbag in a suitable casing. It is ready for use at any time and is light in weight, since, advantageously, it is made of synthetic material, and it is easy to manipulate even when inserted. It is very hygienic, since, if it has to be cleaned, it may simply be wiped with a cloth or merely rinsed. It operates without pressurizing gas and may be easily filled. The contents can be fully exhausted.

Two embodiments of the invention are illustrated in FIGURES 1 and 2 of the drawing in longitudinal section.

According to the embodiment shown in FIG. 1, the device comprises a hollow rod 1 having a rounded, preferably hemispherical head 2 provided with a number of small spray or distributing apertures 3 as customary in spray nozzles for example.

An axially displaceable dosing piston 4 is located in the hollow rod 1 and has a piston rod 5 provided with teeth 6. The piston rod 5 is guided in a sleeve 7 which, for this purpose, has an elongated guide slot 8 in its head. The lower part of the sleeve 7 has an annular shoulder 9 with which the sleeve is pressed by a spring 11 against an annular shoulder 10 or a step in the interior of the hollow rod 1. One end of the spring 11 abuts against the annular shoulder 9 and its other end against an axially displaceable base part 12 of the hollow rod 1. The spring is guided by the lower end 13 of the sleeve 7 projecting beyond the annular shoulder 9.

The base portion 12 is covered by an axially displaceable pressure piece 15 placed therebefore and secured against falling out by a spring ring 14. A push rod 16 advantageously constructed as a leaf spring is mounted in the base part 12 of cap-like construction and its other, slightly angled end 17 engages in the teeth 6 of the piston rod 5 of the dosing piston 4.

A pin 18, coloured red for example, is mounted externally on the base of the dosing piston 4 and projects outwardly through an aperture in the tip 2 when the dosing piston is located in its upper end position illustrated in the drawings, i.e. when the device is empty. For the device to be completely emptied, the inner wall 22 of the tip is of flat construction, as shown in FIGURE 2.

According to FIGURE 2 a resilient diaphragm 26 rigidly clamped by a ring 24 may be used instead of the axially displaceable base part 12, the push rod 16 being connected to said diaphragm. If desired, the pressure piece 15 may also be omitted, so that the thumb or finger pressure is exerted directly on to the diaphragm. In this case the diaphragm is in the position as indicated by 26'. If need be, the spring 11 may also be omitted. The diaphragm then carries the push rod 16 and springs back into its initial position when the thumb or finger pressure ceases.

The device operates as follows: It is assumed that the device is filled with a contraceptive agent. The piston 4 is then located in its lowest position closely above the sleeve 7. If the device is to be used, its front end is inserted into the vagina. This is effected in an effortless manner, since the device has a circular cross section and is of suitable thickness. After insertion, the pressure piece 15 is displaced axially forwards by thumb or finger pressure and thus displaces the base part 12 against the pressure of the spring 11. Thus, the push rod 16 is axially displaced and its upper or front end 17 displaces the piston rod 5 and thus the dosing piston 4 by one tooth space via the teeth 6. A quantity of contraceptive agent corresponding to one tooth space of the teeth 6 is thereby forced through the apertures 3 into the vagina. When the pressure piece 15 is released, the base part 12 is returned to its initial position by the spring 11 and thus carries with it the push rod 16 whose upper end 17 slides over the tooth located therebelow and into the next lower tooth space. During this movement, the dosing piston remains in its position determined by the wall friction between the piston and the wall of the rod. Thus, it is not withdrawn by the push rod.

Thus, each pressure on the pressure piece 15 displaces the dosing piston by an accurately measured distance corresponding to one tooth space until the dosing piston has reached its illustrated upper end position in which the pin 18 projects from the tip 2, or is visible, thus indicating that the device is empty.

In order to refill the device, all the parts have to be removed from the rod. This is easily effected after the release of the spring ring 14, since all the parts may then be removed. After the device is filled, the parts are reinserted and secured by the spring ring 14.

The invention is not confined to the example illustrated and described. For example, the feed gear may be of different construction. The main point is that an accurately measured and equal quantity is dispensed outwardly from the device each time, i.e., at each stroke of the piston.

According to FIGURE 2 the device may be constructed so that it comprises two halves 1' and 21 which may be screwed at 20 or assembled together in any other way. If the example is taken as a basis, the rod would be divided slightly above the base of the piston in the lower end position of the piston. Thus, the lower half 21 would contain the piston 4 in addition to the entire drive. In this case, the upper half would be filled with the agent. The two halves would then be assembled or screwed together. In this construction, the removal of all the parts from the rod is obviated after the removal of the pressure piece 15 which now remains in position. Thus, the filling operation is simpler. However, in order to prevent injury, the device must be dimensioned such that, when it is inserted, the joint 20 between the upper and lower halves is outside the body.

Further, provision may be made for varying the stroke of the dosing piston. For this purpose, one or a plurality of pins spaced one above the other may be arranged laterally in the rod wall and pressed into the rod by finger pressure, or the like, for limiting the stroke of the base part 12. The relevant pin then projects into the path of the base part which may now be displaced only until it abuts against the pin. Thus, the stroke of the base part and the stroke of the push rod 16 is reduced and the dosing piston is consequently displaced forwardly by a shorter distance than when the stop pin is pushed back or withdrawn. This modification is not illustrated in the drawing.

Alternatively the device may be constructed such that the quantity dispensed is effected by the radial compression of the lower part instead of by pressure on the base.

According to FIGURE 2 the rod 1' has a longitudinal transparent part 28 having a scale 30 on it and the piston 4 is provided with a corresponding marking 32, such that from the position of the marking with respect to the scale the contents of the hollow rod can be ascertained at a glance.

The device is suitable not only for inserting contraceptives, but also for dispensing other prophylactic agents and medicaments as well as cosmetics.

What I claim is:

1. An applicator device intended for repetitive dispensing of a measured amount of fluid treating agent such as a contraceptive composition without reliance on a pressurizing gas into a body cavity, comprising
   an elongated, hollow tubular rod adapted to be filled with the agent and having a rounded discharge tip with at least one small outlet opening,
   a piston axially displaceable within said hollow rod,
   a yieldingly movable base means at the end of the hollow rod opposed to the tip, and
   feed gear means within the tubular rod connected between the piston and the base means such that each time the base means is axially pushed into the rod the piston is moved a predetermined distance forward toward the tip and remains in this position after release of the base.

2. A device according to claim 1 wherein the feed gear means comprises a toothed piston rod secured to the piston and a push rod having one end engaging the teeth of the piston rod and the other end connected to the base means.

3. A device according to claim 1 wherein the feed gear means comprises a toothed piston rod secured to the piston and a leaf spring-containing push rod having an angled end engaging the teeth of the piston rod and the other end connected to the base means.

4. A device according to claim 1 wherein the base means comprises a resilient diaphragm the periphery of which is secured to the tubular rod.

5. A device according to claim 1 wherein the base means comprises a plate axially slideable within the tubular rod.

6. A device according to claim 2 wherein the piston rod is guided in a sleeve means into which the push rod extends.

7. A device according to claim 6 wherein a spring is located between the sleeve means and the base means and bears against said sleeve means and said base means.

8. A device according to claim 1 wherein a pin indicator means is mounted exteriorly on the face of the piston facing toward the discharge tip and constructed such that it becomes visible by projecting outwardly through an aperture in the tip when the piston is located in the empty position.

9. A device according to claim 1 wherein the hollow rod is divided in the transverse direction in the vicinity of the full position of the piston, thereby forming two tubular parts which may be assembled and disassembled to facilitate loading and reloading of the device with treating agent.

10. A device according to claim 1 wherein the rod has a longitudinal transparent portion having a scale thereon and the piston is provided with a corresponding marking adapted to facilitate visual determination of agent remaining within the device.

References Cited

UNITED STATES PATENTS 3,154,076 10/1964 O'Donnell _____ 128—234
3,220,413 11/1965 Sunnen _____ 128—261

ADELE M. EAGER, Primary Examiner

U.S. Cl. X.R.

128—234, 264